(12) United States Patent
Schaefer

(10) Patent No.: US 6,758,243 B2
(45) Date of Patent: Jul. 6, 2004

(54) PRESSURE ACCUMULATOR, AND METHOD FOR PRODUCING THE SAME

(75) Inventor: Ernst-Dieter Schaefer, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 09/996,491

(22) Filed: Nov. 29, 2001

(65) Prior Publication Data

US 2002/0096223 A1 Jul. 25, 2002

(30) Foreign Application Priority Data

Nov. 29, 2000 (DE) .......................................... 100 60 558

(51) Int. Cl.⁷ ................................................. F16L 55/04
(52) U.S. Cl. ......................................... 138/30; 138/31
(58) Field of Search .................................... 138/30, 31

(56) References Cited

U.S. PATENT DOCUMENTS

| | | | | |
|---|---|---|---|---|
| 3,804,125 A | * | 4/1974 | Sonneman ................... 138/30 |
| 4,143,678 A | * | 3/1979 | Sugimura et al. ............. 138/30 |
| 4,997,009 A | * | 3/1991 | Niikura et al. ................ 138/30 |
| 5,222,466 A | * | 6/1993 | Gratziani ................. 123/193.6 |
| 5,857,753 A | * | 1/1999 | Gowda .................... 303/116.4 |
| 6,076,557 A | * | 6/2000 | Carney ........................ 138/30 |
| RE36,951 E | * | 11/2000 | Cooper et al. ............... 73/40.7 |
| 6,189,572 B1 | | 2/2001 | Ruffer |
| 6,363,719 B2 | * | 4/2002 | Mohr et al. ................... 60/414 |
| 6,666,529 B2 | * | 12/2003 | Mohr .......................... 303/87 |

FOREIGN PATENT DOCUMENTS

DE 41 18 834 A1 12/1992

* cited by examiner

Primary Examiner—James Hook
(74) Attorney, Agent, or Firm—Michael J. Striker

(57) ABSTRACT

A pressure accumulator has a housing having at least one pressure medium opening, a diaphragm chamber arranged inside the housing and having a side wall which is at least partially deformable, and a pressure medium chamber arranged outside of the diaphragm chamber, the pressure medium chamber at least partially being limited by a partially permeable material which allows an exit of gas from the pressure medium chamber but prevents an exit of a pressure medium from the pressure medium chamber.

10 Claims, 3 Drawing Sheets

PRESSURE ACCUMULATOR, AND METHOD FOR PRODUCING THE SAME

BACKGROUND OF THE INVENTION

The present invention relates to a pressure accumulator as well as to a method of producing the same.

More particularly, it relates to a pressure accumulator which has a housing with at least one pressure medium opening, a substantially cylindrical diaphragm chamber arranged inside of the housing and having a side wall which is at least partially deformable, and a pressure medium chamber arranged outside of the diaphragm chamber.

The present invention also relates to a method for producing a pressure accumulator with a housing having at least one pressure medium opening, a substantially cylindrical diaphragm chamber arranged inside the housing and having a side wall, at least one substantially cylindrical diaphragm chamber which is arranged inside the housing and has a side wall which is at least partially deformable, and a pressure medium chamber arranged outside the diaphragm chamber.

Such pressure accumulators are used in particular in motor vehicle braking devices. A hydraulic pump is associated preferably at the outer side with the pressure medium chamber under pressure, so that potential energy is available for a braking device which is coupled with wheel. An elastic force is available due to a compressible diaphragm chamber. This elastic force is counteracted by the force which is applied by the pressure of the pressure medium, so that the pressure accumulator function is produced. The diaphragm chamber is filled with gas. An elastic force is therefore made available due to the at least partially deformable side wall and due to the compression of the gasses located in the diaphragm chamber.

In the case of uptightness of such a diaphragm chamber gas exits the inner space of the diaphragm chamber into the pressure medium chamber and thereby under unfavorable conditions gas can penetrate into the braking device. This can lead to a damage and operational error of the braking system.

SUMMARY OF THE INVENTION

Accordingly it is an object of the present invention to provide a pressure accumulator, and a method for producing the same which avoid the disadvantages of the prior art.

In keeping with these objects and with others which will become apparent hereinafter, one feature of present invention resides, briefly stated, in a pressure accumulator, in which the pressure medium chamber is limited at least partially by a partially permeable material which allows exit of gas from the pressure medium chamber and prevents exit of pressure medium from the pressure medium chamber.

In this way it is possible that gas which is in the pressure medium chamber is removed purposefully from the pressure medium chamber. Thereby it is prevented that gas enters the braking device and can lead to operational disturbances. The pressure accumulator, despite leaking diaphragm, remains operational.

Preferably, the side wall of the diaphragm chamber is bellows-shaped. Due to the bellows-shaped design, the diaphragm chamber is deformable so that elastic force required for the pressure accumulator operation is available.

It is also advantageous when a first head side of the diaphragm chamber is sealingly closed with a metal bottom. In this way, a solid limit of the diaphragm chamber is available, which imparts a shape stability to the side wall.

Preferably the second head side of the diaphragm chamber is sealingly closed with a filling member. Through this filling member, gas such as for example air can be filled in the diaphragm chamber, so that due to the compressibility of the gas, a counterpressure to the pressure of the pressure medium is applied. Preferably, the pressure medium opening is closeable by a metal bottom. When the pressure inside the diaphragm chamber exceeds the pressure of the pressure medium, then the pressure medium chamber is closed against the other components of the braking device, so that the hydraulic pressure assumes a lower value than the gas pressure in the diaphragm chamber.

It is advantageous when the pressure medium chamber is limited at a side by a partially permeable material, which in mounted condition of the pressure accumulator is the upper side. Finally, the gas which flows from the diaphragm chamber by a leakage in the diaphragm in the pressure medium chamber is driven by the action of the gravity force in the region of the partially permeable material. Therefore the gas can exit through the partially permeable material into the atmosphere.

It is advantageous when the pressure medium chamber is arranged ring-shaped around the diaphragm chamber, and when the partially permeable material is formed as a ring-shaped element which limits in ring-shaped manner the pressure medium chamber. The ring shape of the partially permeable material is especially favorable to limit the cylindrical pressure medium chamber which expands around the diaphragm chamber to the upper side of the pressure accumulator.

It is especially useful when the partially permeable material is a ceramic material. A ceramic material can have a porosity provided by steam treatment or a special compaction, which allows a gas exchange but prevents a liquid exchange. Also, ceramic diaphragms are produced with a smaller pore size, which allow a gas exchange and prevent a liquid exchange. It is especially advantageous when the side of the partially permeable material which faces the pressure medium chamber is provided with a pore size of less than 10 A. Thereby it is prevented that the liquid infiltrates through capillary forces into the ceramic material.

Preferably, the side of the partially permeable material which faces away the pressure medium chamber is provided with a sealing pack which acts as a valve. The sealing pack allows the exit of gas from the pressure medium chamber into the atmosphere. It however prevents the entry of gas from the atmosphere into the pressure medium chamber. The later is especially advantageous in connection with the evacuation of the pressure medium chamber.

The present invention deals with a method, in accordance with which at least one opening of the housing is closed with a partially permeable material. In this way it is possible to remove from the pressure medium chamber gas which enters the pressure medium chamber. Thereby it is prevented that the gas enters the braking device and leads to operational disturbances. The pressure accumulator, despite leaking diaphragm remains operational.

It is especially advantageous when a head side of the diaphragm chamber is closed, in that, the side wall of the diaphragm chamber is mounted on a filling member by a laser welding process. Also different welding processes are suitable for producing the connection between the diaphragm chamber and the filling member, while a laser welding process provides for especially good results.

Furthermore, it is advantageous when the partially permeable material is formed as a ring-shaped element, and the ring-shaped element is pressed in a region between the housing and the filling member. This pressing of the ring-shaped element closes the housing in a fluid-tight manner, while a gas exchange remains possible because of the partial permeability.

An especially useful connection in view of the pressure tightness of the element is provided between the ring-shaped element and the filling member when a caulking connection is produced. Thereby a pressure accumulator can be produced which can withstand high pressures in the region of approximately 200 bar.

The present invention is based on a surprising consideration that it is possible to provide a pressure accumulator which despite a leaking diaphragm maintains its operational ability, wherein it prevents that gas due to a leak in a diaphragm reaches the braking system. This is achieved with the use of a partially permeable material which is arranged at a suitable point of the pressure accumulator and thereby relieves gas into atmosphere. As for the fluid, the material is however not permeable, so that the principal operation with respect to the pressure medium remains not negatively changed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
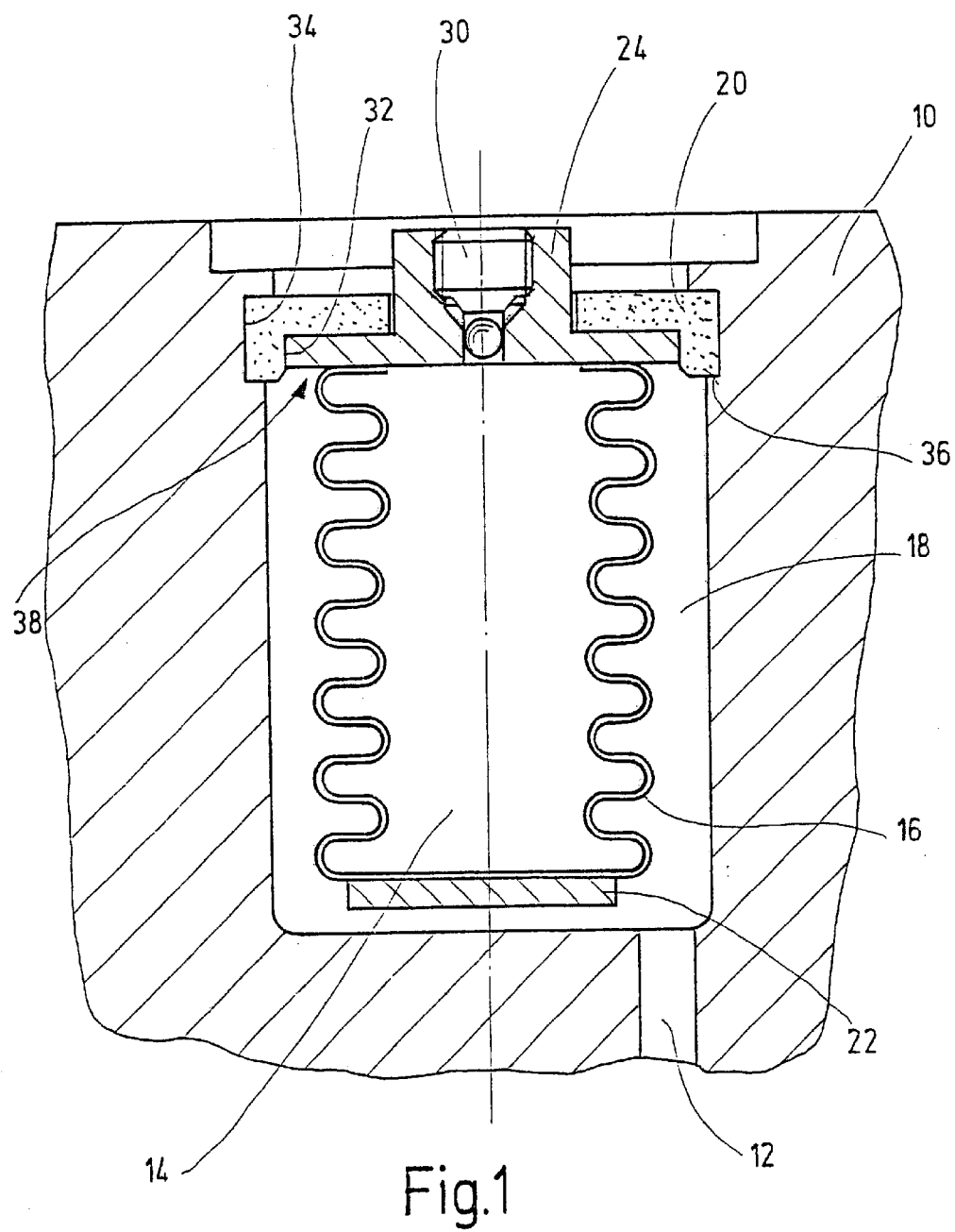
FIG. 1 is a view showing a section of an inventive pressure accumulator in accordance with the first embodiment of the present invention.

FIG. 1 shows a cross-section of a pressure accumulator in accordance with the present invention. The pressure accumulator has a housing 10 with a pressure medium opening 12 provided in the housing 10. A diaphragm chamber 14 is arranged in the housing 10 and has a bellows-like folded side wall 16. The diaphragm chamber 14 is surrounded by a pressure medium chamber 18, in which the pressure medium opening 12 opens.

The upper head side of the diaphragm chamber 14 is closed by a filling member 24. Through the filling member 24 and an opening 30 arranged in the filling member 24, the interior of the diaphragm chamber 14 can be filled. The filling member in an upper region of the pressure accumulator has a smaller diameter than in the lower region. It expands downwardly to the diameter identified with reference numeral 32. The housing 10 in the region of this axial section has an inner diameter which is identified with reference numeral 34. The inner diameter 34 of the housing 10 is greater than the outer diameter 32 of the filling member 24. The thusly produced ring-shaped gap at the upper side of the pressure accumulator is closed by a ring-shaped element 20.

The ring-shaped element 20 is pressed in the opening of the housing 10 and over the outer diameter of the filling member 24 so that a pressure-type connection is produced. Finally, the ring-shaped element 20 is seated on a projection 36 of the housing 10. Preferably, for a good pressure tightness, a caulking connection is formed between the ring-shaped element 20 and the filling member 24.

The ring-shaped element 20 is formed of a partially-permeable material. The partial permeability is achieved by providing a porous material. The pore size in the part of the ring-shaped element 20 facing the pressure medium chamber 18 can be in a nanometer region. Subsequent layers in direction to the outer side of the ring-shaped region can be located in ultra- and nano filtration region, for example in micro region. Through these layers from the pressure medium chamber a partial pressure drop is available, which for example drives nitrogen, which exits from a leakage point of the side wall 16 of the diaphragm chamber 14 and collects in the region 38, from the pressure medium chamber 18.

Figure 2:
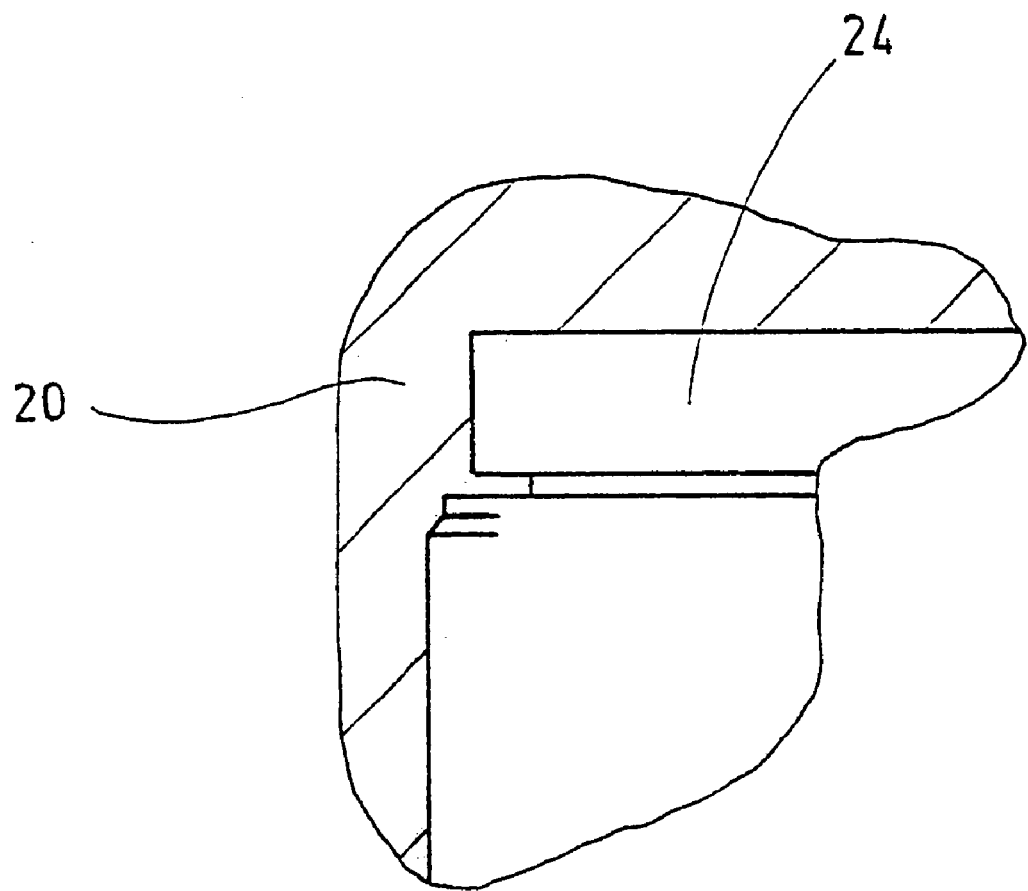
FIG. 2 is a view showing a part of the inventive pressure accumulator of FIG. 1.

FIG. 2 shows a detail of FIG. 1, namely a caulking connection between the ring-shaped element 22 and the filling member 24. Such a circumferential caulking satisfies especially high requirements for a pressure tightness.

Figure 3:
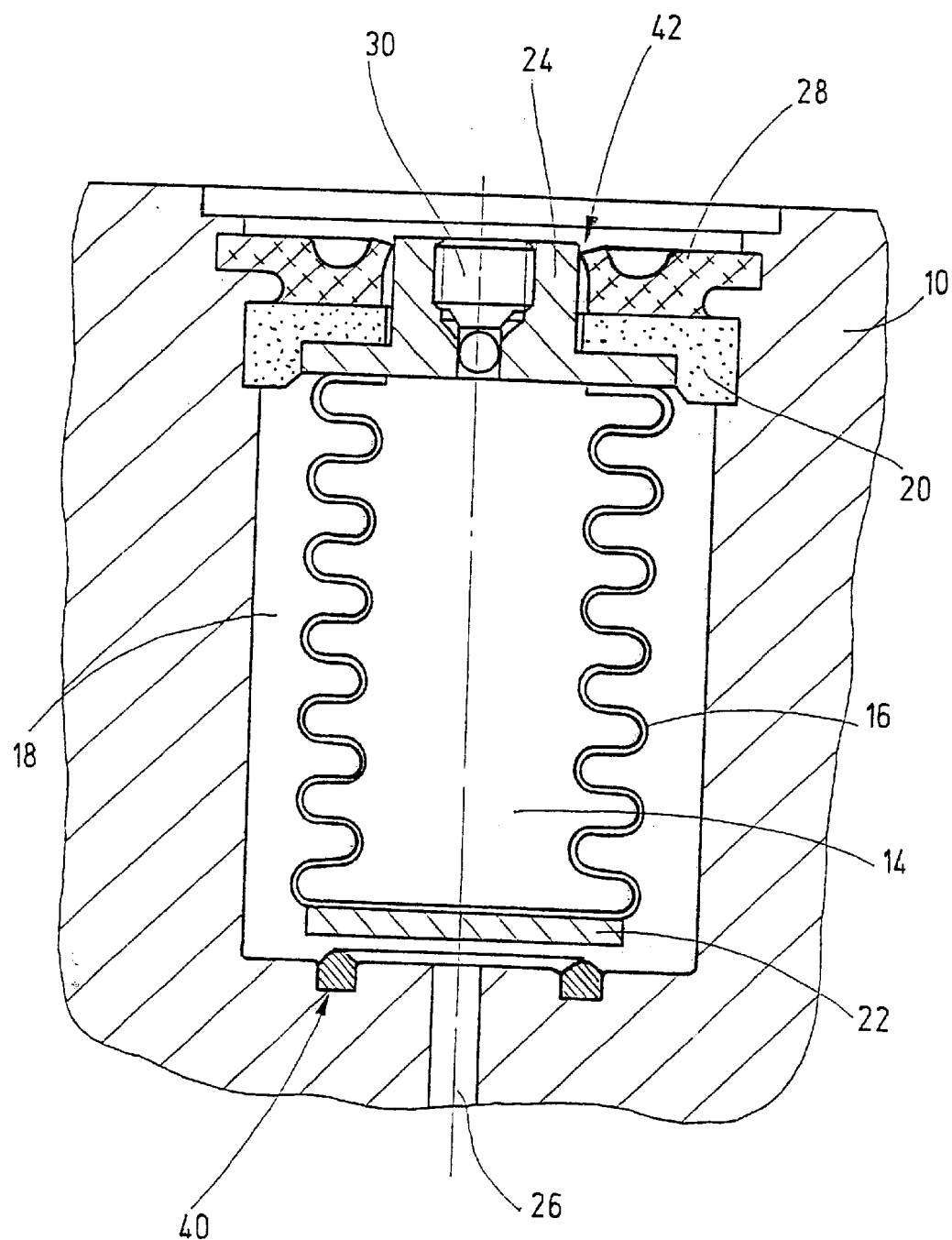
FIG. 3 is a view showing a sectional view of a second embodiment of the inventive pressure accumulator.

FIG. 3 shows a further embodiment of the inventive pressure accumulator, in a cross-section. Elements which correspond to the elements of FIG. 1 are identified with the same reference numerals. In contrast to the pressure accumulator of FIG. 1, in the pressure accumulator of FIG. 3 the pressure medium supply 26 is arranged in an axis of the pressure medium accumulator. The pressure medium supply 26 is surrounded by a sealing element 40. When the diaphragm chamber 14 extends so that the metal bottom 22 of the diaphragm chamber 14 is in connection with the sealing element 40, then the pressure medium chamber 18 is sealed against the braking device. Thereby a condition is produced, with which the hydraulic pressure in the braking device is smaller than the gas pressure in the diaphragm chamber.

Furthermore, above the ring-shaped partially permeable element 20, a sealing pack 28 is provided which provides a valve action in the region identified with reference numeral 42. Gas can escape from the pressure medium chamber 18 into the atmosphere. The pressure pack 28 however closes the pressure medium chamber 18 during the evacuation from the atmosphere, so that no gas can enter the pressure medium chamber 18.

A material for the partially permeable ring-shaped element 20 can be a ceramic material, for example stainless sintered steel. Also, ceramic diaphragms with a smaller pore size can be used. The porosity can be influenced by steam treatment or by a targeted compaction. This prevents that a pressure medium with a predetermined molecular mass penetrates by capillary forces into the pressure medium material and hinders the operation of the partially permeable element 20.

It will be understood that each of the elements described above, or two or more together, may also find a useful application in other types of constructions differing from the types described above.

While the invention has been illustrated and described as embodied in pressure accumulator, and method for producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A pressure accumulator, comprising a housing having at least one pressure medium opening; a diaphragm chamber arranged inside said housing and having a side wall which is at least partially deformable; and a pressure medium chamber arranged outside of said diaphragm chamber, said pressure medium chamber at least partially being limited by a partially permeable material which allows an exit of gas from said pressure medium chamber but prevents an exit of a pressure medium from said pressure medium chamber.

2. A pressure accumulator as defined in claim 1, wherein said side wall of said diaphragm chamber is bellows-shaped.

3. A pressure accumulator as defined in claim 1, wherein said diaphragm chamber has a first head side which is sealingly closed by a metal bottom.

4. A pressure accumulator as defined in claim 3 wherein said diaphragm chamber has a second head side which is sealingly closed by a filling member.

5. A pressure accumulator as defined in claim 3, wherein said pressure medium opening is closable by said metal bottom.

6. A pressure accumulator as defined in claim 1, wherein said partially permeable material is a ceramic material.

7. A pressure accumulator as defined in claim 1, wherein said partially permeable material has a side which faces said pressure medium chamber and has a pore size of less than 10 A.

8. A pressure accumulator, comprising a housing having at least one pressure medium opening; a diaphragm chamber arranged inside said housing and having a side wall which is at least partially deformable; and a pressure medium chamber arranged outside of said diaphragm chamber, said pressure medium chamber at least partially being limited by a partially permeable material which allows an exit of gas from said pressure medium chamber but prevents an exit of a pressure medium from said pressure medium chamber, said pressure medium chamber being limited by said partially permeable material at one side which in a mounted condition of the pressure accumulator forms an upper side.

9. A pressure accumulator, comprising a housing having at least one pressure medium opening; a diaphragm chamber arranged inside said housing and having a side wall which is at least partially deformable; and a pressure medium chamber arranged outside of said diaphragm chamber, said pressure medium chamber at least partially being limited by a partially permeable material which allows an exit of gas from said pressure medium chamber but prevents an exit of a pressure medium from said pressure medium chamber, said pressure medium chamber being arranged ring-shaped around said diaphragm chamber, said partially permeable material being formed as a ring-shaped element which ring-shaped limits said pressure medium chamber.

10. A pressure accumulator, comprising a housing having at least one pressure medium opening; a diaphragm chamber arranged inside said housing and having a side wall which is at least partially deformable; and a pressure medium chamber arranged outside of said diaphragm chamber, said pressure medium chamber at least partially being limited by a partially permeable material which allows an exit of gas from said pressure medium chamber but prevents an exit of a pressure medium from said pressure medium chamber, said partially permeable material having a side which faces away from said pressure medium chamber and is provided with a sealing pack acting as a valve.

* * * * *